March 11, 1952 W. J. GRUEN 2,588,921

OSCILLATOR SYNCHRONIZING SYSTEM

Filed Dec. 8, 1949

Inventor:
Wolf J. Gruen,
by Merton D. Moore
His Attorney.

Patented Mar. 11, 1952

2,588,921

UNITED STATES PATENT OFFICE 2,588,921

OSCILLATOR SYNCHRONIZING SYSTEM

Wolf J. Gruen, Syracuse, N. Y., assignor to General Electric Company, a corporation of New York Application December 8, 1949, Serial No. 131,850

9 Claims. (Cl. 250—36)

Figure 1:
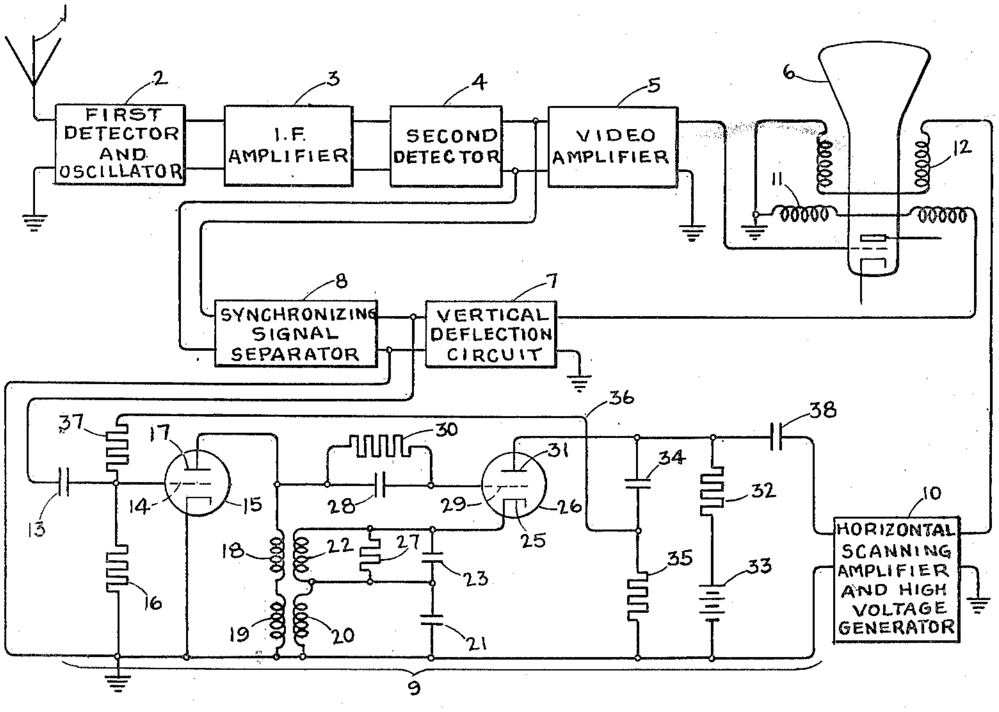

My invention relates to oscillator synchronizing systems and, more particularly, to oscillator synchronizing systems which are adapted for use with a synchronizing signal consisting of periodically recurring pulses which may be interspered with spurious and undesired noise impulses. While my invention is of general utility, it is particularly suitable for use in the scanning circuits, especially the line frequency scanning circuit, of a television receiver.

In television receivers it is necessary to synchronize the scanning oscillators thereof by means of synchronizing pulses which are superimposed on the received video signal so as properly to reproduce the transmitted image. In my copending application Serial No. 95,538, which was filed May 26, 1949 and which is assigned to the same assignee as my present invention, there is described and claimed a synchronizing oscillator of the resonant circuit type wherein selected synchronizing pulses are injected into the resonant circuit of the oscillator so as to maintain the produced oscillations in substantially fixed phase relationship with respect to the synchronizing pulses. Due to the selectivity of the resonant circuit and the so-called flywheel action thereof, substantial noise rejection as compared to direct synchronization is achieved by such a circuit. Further synchronizing systems of the resonant circuit type are described and claimed in my co-pending patent applications, Serial No. 98,347, filed on June 10, 1949, now U. S. Patent No. 2,585,929 dated February 19, 1952, and Serial No. 118,334, filed on September 28, 1949, now U. S. Patent No. 2,585,930 dated February 19, 1952, and assigned to the same assignee as my present invention.

In the arrangement disclosed in my copending application Serial No. 95,538 mentioned above, the synchronizing range of the oscillator is determined by the fundamental frequency energy content of the synchronizing pulses. Also, in such resonant circuit oscillators the noise rejection qualities of such a system are a function of the angle of the oscillator. Furthermore, almost all present day television receivers employ an inductive kick type of high voltage generator which is energized from the horizontal scanning oscillator. The output of such a generator is a function of the steepness of the wave front produced by the scanning oscillator. Hence, it is particularly important in scanning oscillators of the resonant circuit type to provide a scanning wave having a relatively steep retrace characteristic. Accordingly, it is a primary object of my invention to provide a new and improved scanning oscillator of the resonant circuit type.

It is a further object of my invention to provide a new and improved scanning oscillator circuit of the resonant circuit type in which the synchronizing range of the oscillator is substantially increased.

It is another object of my invention to provide a new and improved scanning oscillator system of the resonant circuit type which is adapted to be synchronized by means of a synchronizing signal consisting of periodically recurring pulses which may be interspersed with spurious and undesired noise impulses wherein the conduction angle of the oscillator is substantially reduced.

It is still another object of my invention to provide a new and improved scanning oscillator system of the resonant circuit type wherein the scanning waveform derived therefrom is of increased steepness during the retrace period thereof.

It is a further object of my invention to provide a new and improved scanning oscillator system of the resonant circuit type in which the susceptibility to noise impulses interspersed with desired synchronizing pulses is substantially reduced.

Briefly, in accordance with my invention, the scanning oscillator is provided with a first resonant circuit which has relatively low damping and is tuned to the frequency of occurrence of the synchronizing pulses, and with a second resonant circuit which has relatively high damping and is tuned to a harmonic of the pulse frequency. Coupling means are employed to feed back energy from both resonant circuits to the input electrode of the oscillator so as to produce sustained oscillations in the first resonant circuit and damped oscillations in the second resonant circuit. The synchronizing pulses are injected into both resonant circuits so as to maintain the sustained oscillations produced across the first resonant circuit in substantially fixed phase relationship with respect to the synchronizing pulses. Due to the superposition of fundamental and harmonic waveforms, the conduction angle of the oscillator is substantially reduced, thereby providing substantially increased noise rejection. Also, due to the fact that both resonant circuits extract energy from the injected synchronizing pulses, the synchronizing range over which the oscillator may be maintained in step is substantially increased. In a preferred embodiment, the second resonant circuit is tuned to the third harmonic of the pulse frequency so as to obtain a scanning waveform having a wave front of increased slope.

The novel features which are considered to be characteristic of my invention are set forth with particularity in the appended claims. My invention itself, however, both as to its organization and method of operation, together with further objects and advantages thereof, may best be understood by reference to the following description taken in connection with the accompanying drawing wherein Fig. 1 is a schematic diagram, partly in block diagram form, of a television receiver embodying the principles of my invention, and Fig. 2 is a timing diagram of various waveforms of the circuit of Fig. 1.

Figure 2:
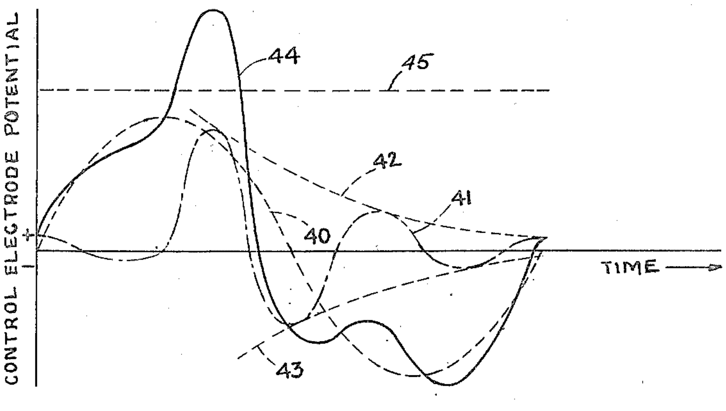

Referring now more particularly to the drawing, the system illustrated in Fig. 1 comprises a modulated carrier wave television receiver of the superheterodyne type including an antenna system 1, which is connected to a first detector and oscillator 2, to which are connected in cascade relation in the order named an intermediate frequency amplifier 3, a second detector 4, a video amplifier 5 and a cathode ray tube viewing device 6. A vertical deflection circuit 7 is connected to the second detector 4 through a synchronizing signal separator 8. The output of the synchronizing output separator is also connected to a synchronizing scanning oscillator 9, to be described more fully hereinafter, the output of scanning oscillator 9 being connected to a horizontal scanning amplifier and high voltage generator 10. The outputs of vertical deflection circuit 7 and horizontal scanning amplifier 10 are connected to their respective scanning coils 11, 12 which surround the neck of the cathode ray tube 6, and the output of the high voltage generator portion of amplifier 10 is connected to the accelerating anode of the cathode ray tube 6.

The units 1 through 8 inclusive and 10 may all be of conventional well-known construction so that a detailed illustration thereof is unnecessary herein. Referring briefly, however, to the operation of the above described system as a whole, television signals intercepted by antenna circuit 1 are applied to oscillator detector 2 wherein they are converted into intermediate frequency signals which are, in turn, selectively amplified in the intermediate frequency amplifier 3 and delivered to the second detector 4. The modulation components of the received signal are detected in second detector 4 and are applied to the video amplifier 5 wherein they are amplified and from which they are supplied in the usual manner to the control electrode of the cathode ray tube 6.

The detected modulation components are also supplied to the synchronizing signal separator 8 wherein the vertical and horizontal synchronizing signals are separated, the vertical synchronizing signal being applied to the vertical deflection circuit 7. Scanning waves, which are generated in the horizontal oscillator 9, are amplified in the horizontal amplifier 10 and applied to the scanning coils 12 of the cathode ray device. Likewise, scanning waves from the vertical scanning circuit are applied to the scanning coils 11 so as to produce magnetic scanning fields which deflect the electron beam in two directions normal to each other so as to trace a rectilinear pattern on the screen thereby to reconstruct the transmitted image.

Referring now more particularly to the portion of Fig. 1 embodying the present invention, synchronizing signals of negative polarity are connected from the synchronizing signal separator 8 through a coupling capacitor 13 to the control electrode 14 of an electron discharge device 15. The cathode of device 15 is connected to ground and the anode 17 of device 15 is connected through a first inductance 18 and a second inductance 19 to ground. A grid leak resistor 16 is used to complete the control electrode path of device 15. A first resonant circuit comprising an inductance 20 and a capacitor 21, has its lower terminal connected to ground. Its upper terminal is connected to the cathode 25 of a second electron discharge device 26 through a second resonant circuit, comprising an inductance 22 and a capacitor 23. A damping resistor 27 is shunted across the second resonant circuit 22, 23. The anode of device 15 is also connected through a capacitor 28 to the control electrode 28 of device 26. A grid leak resistor 30 is connected across capacitor 28 and operates to complete the control electrode path of device 26. The anode 31 of device 26 is connected through a resistor 32 to the positive terminal of a unidirectional source of potential illustrated by the battery 33. The anode 31 is also connected through a capacitor 34 and resistor 35 to ground. A portion of the output wave of device 26 is fed back through a lead 36 and a resistor 37 to the control electrode 14 of device 15. Signals which are generated in the anode circuit of device 26 are coupled through a capacitor 38 to the horizontal scanning amplifier and high voltage generator 10.

Considering now the operation of the above described synchronized oscillator system, it is evident that inductance 20 and capacitor 21 form a parallel resonant circuit in which sustained oscillations may be produced if sufficient energy be added thereto by means of device 26 to compensate for the losses therein during each cycle of oscillation. Such energy is added by device 26 through the medium of feed back coil 19 which is coupled to the control electrode of the device 26 in such a manner as to sustain oscillations in the resonant circuit 20, 21. Cathode current in device 26 also flows through inductance 22 and causes oscillations at the resonant frequency of the parallel circuit 22, 23 to be set up therein. However, due to the damping action of resistor 27, which is shunted across the resonant circuit 22, 23, the oscillations produced therein are damped to a relatively small value during the interval of one cycle of the sustained oscillations in circuit 20, 21. Thus, sustained oscillations are produced in the resonant circuit 20, 21 and damped oscillations, which are locked in synchronism with the sustained oscillations, are produced in resonant circuit 22, 23. The damped oscillations are added to the sustained oscillations through feed back coil 18 so that a composite waveform is applied to the control electrode 29. The second resonant circuit 22, 23 is preferably tuned to the third harmonic of the fundamental frequency of circuit 20, 21 so as to produce a sharply peaked composite waveform which is applied to the control electrode 29 of device 26, as will be described in more detail hereinafter. Due to the relatively narrow peak of the composite waveform produced by the two series connected resonant circuit, the conduction angle of device 26 is very small and device 26 conducts only for a relatively small portion of the oscillator cycle.

Capacitor 28 and resistor 30 provide a grid bias network, the capacitor 30 being charged during the positive peaks of the composite voltage produced across feedback coils 18 and 19. The charging of capacitor 30 provides a negative bias voltage which operates to hold device 22 in a state of nonconduction for a major portion of the oscillation cycle. Due to the fact that device 26 conducts for only a short portion of the oscillatory cycle, the anode current of device 26 will be in the form of relatively narrow pulses. The pulses of oscillator anode current operate periodically to discharge capacitor 34 which has previously been charged from the potential source 33 through resistors 32 and 35. There is thus produced at the anode 31 a scanning voltage which is suitable for scanning the cathode ray tube. The scanning voltage is coupled through capacitor 38 to the horizontal scanning amplifier 10 wherein it is suitably amplified so as to drive the horizontal scanning coils 12.

Device 15 operates to synchronize the oscillations produced in resonant circuits 20, 21 and 22, 23 with the incoming synchronizing pulses by injecting the synchronizing pulses into the resonant circuits through the coupling coils 18, 19. Because of the selectivity of the resonant circuit 20, 21 and to a lesser extent the selectivity of resonant circuit 22, 23, and the inertia to changes of amplitude and frequency of the energy oscillating therein, these resonant circuits are analagous to flywheels of substantial mass which tend to rotate at a given speed despite random braking effects thereupon. The flywheel effect of these circuits has an averaging effect on random noise pulses which are interspersed with the periodic synchronizing signals, which effect is comparable to that obtained with the integration circuit used in a phase detector type of synchronizing system. Hence, the synchronizing signals may be applied directly to the resonant circuit of the scanning oscillator and still obtain a substantial discrimination against spurious and undesired noise pulses.

The synchronizing action of device 15 is discussed in detail in my previously mentioned copending application Serial No. 118,334, which was filed on September 28, 1949 and which is assigned to the same assignee as my present invention, and reference may be had thereto for such detailed description. For the purposes of my present invention, it may be stated that the device 15 operates as an energy absorbing means which is shunted across both resonant circuits of the oscillator through the medium of the coupling coils 18, 19. The synchronizing pulses operate periodically to render device 15 nonconductive so as to remove the energy absorbing effect of device 15 from the resonant circuits. The synchronizing pulses thus have the effect of adding energy to the oscillatory circuits by rendering the energy absorbing device 15 nonconductive at periodic intervals. Due to the feedback circuit including resistor 37 the amount of energy injected into the resonant circuits by the synchronizing pulses is made to vary in accordance with the phase relationship of the synchronizing pulses and the oscillator.

With such an arrangement the oscillator adjusts itself to a frequency at which the energy absorbing device 15 exercises a minimum amount of damping on the resonant circuits of the oscillator. This means that the oscillator synchronizes with the synchronizing pulses in such a way that the sinusoidal oscillations of the oscillator go through a positive maximum at the time when the synchronizing pulses occur.

To increase the synchronizing range of the oscillator and to provide increased noise rejection thereby, I provide in accordance with my present invention a plurality of oscillatory circuits which extract energy from the synchronizing pulses. While the synchronizing pulses are generally of square wave configuration, they are, in reality, made up of a plurality of sinusoidal waves which are in harmonic relation to the fundamental or recurrence frequency of the pulse wave train. Therefore, if additional energy represented by the harmonics of the pulses is extracted from the synchronizing pulses, the operating, or lock-in, range of the oscillator may be substantially increased. By providing a harmonic resonant circuit which is itself locked in synchronism with the fundamental resonant circuit, I am able to utilize not only the fundamental frequency energy content of the synchronizing pulses but also a certain amount of the harmonic frequency energy content thereof. This enables the synchronizing pulses to lock in the oscillator over a substantially increased frequency range. While I have indicated only a single damped harmonic circuit in series with the fundamental tank circuit, it will be apparent to those skilled in the art that a plurality of damped resonant circuits tuned to harmonics of the fundamental frequency of the synchronizing pulses may be used to extract additional energy from the synchronizing pulses. In this connection it will be apparent that the oscillations produced in the damped harmonic circuits are forced to oscillate in synchronism with the fundamental oscillations in resonant circuit 20, 21. In visualizing the operation of the circuit of Fig. 1 it will be helpful to refer to the composite waveform which is obtained by a superposition of the waveforms of resonant circuits 20, 21 and 22, 23. Such waveforms are given in Fig. 2 wherein the sinusoidal oscillation produced across resonant circuit 20, 21 is illustrated as the sine wave 40. The oscillations produced across the third harmonic resonant circuit 22, 23 are illustrated by the curve 41. It will be apparent that the oscillations 41 are in the form of a highly damped sine wave, the envelope of this sine wave taking the form of exponential curves 42 and 43. The composite waveform produced by addition of curves 40 and 41 is illustrated by the solid line curve 44.

The cut-off potential of device 26 has been indicated by the dotted line 45 and it is evident by an inspection of the composite waveform 44 that the positive peak thereof is extremely narrow and will operate to render the oscillator conductive only over a very small portion of the oscillator cycle. It is also seen that the sides of the positive peak of waveform 44 are of relatively steep slope so that a high voltage generator of the inductive kick type will produce a substantially increased output when excited by the output waveform of device 26. While I have indicated the resonant circuit 22, 23 as tuned to the third harmonic of the pulse frequency, so as to obtain a single peak waveform of narrow width, it will be apparent that other harmonics, such as, for example, the second harmonic, may be employed to produce a composite single peak waveform of a width narrower than the fundamental.

The synchronizing pulses, through the above described synchronizing action, adjust themselves to the peak of the fundamental sine wave 40. However, it is evident from inspection of Fig. 2 that the peak of the composite wave 44 is displaced to the right by a substantial amount. This displacement of the peak of composite wave 44 is presumably due to the different phase advance produced by the grid time constant 28, 30 for the fundamental frequency of wave 40 and the harmonic frequency of wave 41. This displacement is in the proper direction to provide alignment between the retrace interval, which corresponds to the peak of wave 44, and the synchronizing pulse which occurs at the peak of the sine wave 40.

From the foregoing it is evident that the present invention provides an improved flywheel type synchronized oscillator in which resonant circuits tuned to the fundamental and harmonics of the synchronizing pulses are utilized so as substantially to increase the synchronizing range of the oscillator. Also, due to the particular shape of the composite waveform produced by addition of the fundamental and harmonic frequencies, the conduction angle of the oscillator correspondingly reduces the effect of random noise pulses which may occur during the oscillator cycle.

While my invention has been described by reference to a particular embodiment thereof, it will be understood that numerous modifications may be made by those skilled in the art without departure from my invention. I, therefore, aim in the appended claims to cover all such equivalent variations which come within the true spirit and scope of my invention.

What I claim as new and desire to secure by Letters Patent of the United States is:

1. An oscillator synchronizing system comprising a source of synchronizing pulses, an oscillator comprising an electron discharge device, a first resonant circuit tuned to the fundamentary frequency of occurrence of said synchronizing pulses, a second resonant circuit tuned to a harmonic of said frequency and means for interconnecting said resonant circuits and said electron discharge device so as to produce sustained oscillations having a composite waveform which is the resultant of said fundamental and harmonic frequencies, and means for injecting said synchronizing pulses into said resonant circuits, thereby to maintain said oscillations substantially in phase with said synchronizing pulses.

2. An oscillator synchronizing system comprising a source of synchronizing pulses, an oscillator comprising an electron discharge device having input and output circuits, said input circuit serially including a first resonant circuit having relatively low damping and tuned to the fundamental frequency of occurrence of said synchronizing pulses and a second resonant circuit having relatively high damping and tuned to a harmonic of said frequency, means regeneratively coupling said input and output circuits to produce sustained oscillations of said fundamental frequency in said first resonant circuit and damped oscillations of said harmonic frequency synchronous with said sustained oscillations in said second resonant circuit, and means for injecting said synchronizing pulses into said resonant circuits, thereby to maintain said sustained oscillations in substantially fixed phase relation with respect to said synchronizing pulses.

3. In a scanning system for a television receiver or the like, the combination of a source of synchronizing pulses, an oscillator comprising an electron discharge device having input and output circuits, said input circuit serially including a first resonant circuit having relatively low damping and tuned to the fundamental frequency of occurrence of said synchronizing pulses and a second resonant circuit having relatively high damping and tuned to a harmonic of said frequency, means regeneratively coupling said input and output circuits to produce sustained oscillations of said fundamental frequency in said first resonant circuit and damped oscillations of said harmonic frequency synchronous with said sustained oscillations in said second resonant circuit, means for biasing said device negatively so that it draws anode current only during positive peaks of the resultant oscillatory voltage developed across said input circuit, and means for simultaneously impressing said synchronizing pulses on both said resonant circuits, thereby to maintain said sustained oscillations in substantially fixed phase relation with respect to said synchronizing pulses.

4. In a scanning system for a television receiver or the like, the combination of a source of synchronizing pulses, an oscillator comprising an electron discharge device, a first resonant circuit having relatively low damping and tuned to the frequency fundamental of occurrence of said synchronizing pulses and a second resonant circuit having relatively high damping and tuned to a harmonic of said frequency, means interconnecting said circuits and said device so as to produce sustained oscillations of said fundamental frequency in said first resonant circuit and damped oscillations of said harmonic frequency synchronous with said sustained oscillations in said second resonant circuit, means for biasing said device negatively so that it draws anode current only during positive peaks of the resultant oscillatory voltage developed across said input circuit, means including a second, normally-conductive electron discharge device for absorbing energy from said first and second resonant circuits, and means for periodically reducing the conductivity of said second device in response to said synchronizing pulses to reduce the loading effect of said energy absorbing means on said oscillator during the occurrence of said synchronizing pulses sufficiently to maintain said oscillations in substantially fixed phase relation with respect to said synchronizing pulses.

5. In a scanning system for a television receiver or the like, the combination of a source of synchronizing pulses, an oscillator comprising an electron discharge device, a first resonant circuit having relatively low damping and tuned to the fundamental frequency of occurrence of said synchronizing pulses and a second resonant circuit having relatively high damping and tuned to a harmonic of said frequency, means interconnecting said circuits and said device so as to produce sustained oscillations of said fundamental frequency in said first resonant circuit and damped oscillations of said harmonic frequency synchronous with said sustained oscillations in said second resonant circuit, and means for injecting frequency corrective energy into said first resonant circuit in proportion to the fundamental frequency energy content of said synchronizing pulses and for injecting frequency corrective energy into said second resonant circuit in proportion to the said harmonic frequency energy content of said synchronizing pulses, thereby to maintain said oscillations in substantially fixed phase relation with respect to said synchronizing pulses.

6. In a horizontal line scanning system for a television receiver, the combination of a source of synchronizing pulses, a first resonant circuit having relatively low damping and tuned to the fundamental frequency of occurrence of said synchronizing pulses, a second resonant circuit having relatively high damping and tuned to a harmonic of said frequency, an electron discharge device having at least a cathode, an anode and a control electrode, means connecting said resonant circuits in series circuit relation between said anode and said cathode, means for regeneratively coupling said resonant circuits to said control electrode, thereby to produce sustained oscillations of said fundamental frequency in said first resonant circuit and damped oscillations of said harmonic frequency in synchronism therewith in said second resonant circuit, and means including said coupling means for injecting frequency corrective energy into said resonant circuits in proportion to the fundamental and said harmonic frequency energy contents of said synchronizing pulses, thereby to maintain said oscillations in substantially fixed phase relation with respect to said synchronizing pulses.

7. In a horizontal line scanning system for a television receiver, the combination of a source of synchronizing pulses, a first resonant circuit having relatively low damping and tuned to the frequency of occurrence of said synchronizing pulses, a second resonant circuit having relatively high damping and tuned to a harmonic of said frequency, an electron discharge device having at least a cathode, an anode and a control electrode, means connecting said resonant circuits in series circuit relation between said anode and said cathode, means for regeneratively coupling said resonant circuits to said control electrode, thereby to produce sustained oscillations in said first resonant circuit, means for biasing said device negatively so that it draws anode current only during positive peaks of the resultant oscillatory voltage developed across said input circuit, means including said coupling means for injecting frequency corrective energy into said resonant circuits in proportion to the fundamental and said harmonic frequency energy contents of said synchronizing pulses, thereby to maintain said oscillations in substantially fixed phase relation with respect to said synchronizing pulses, and means for feeding back a portion of said scanning waveform to said energy injecting means.

8. An oscillator synchronizing system comprising a source of periodic synchronizing pulses of predetermined fundamental frequency, an electron discharge device having an anode, cathode and control electrode, a first parallel-resonant circuit sharply tuned to said frequency, a second parallel resonant circuit tuned to a harmonic of said frequency and including a shunt damping resistance, means connecting said two circuits in series circuit between said anode and cathode, inductance means regeneratively coupling both said circuits to said control electrode for the generation of a distorted oscillatory voltage wave across said two circuits having principal components of both said frequencies, said harmonic frequency circuit being adjusted to produce only one major positive voltage peak in each cycle of said wave at said fundamental frequency, means biasing said control electrode so that anode current flows in said device only during said major peak in each said cycle, and means for impressing said synchronizing pulses on said resonant circuits in a sense tending to synchronize said wave with said pulses.

9. An oscillator synchronizing system comprising a source of periodic, unidirectional synchronizing pulses of predetermined fundamental frequency, an electron discharge device having an anode, cathode and control electrode, a first parallel-resonant circuit sharply tuned to said frequency, a second parallel resonant circuit tuned to a harmonic of said frequency and including a shunt damping resistance, means connecting said two circuits in series circuit between said anode and cathode, inductance means regeneratively coupling both said circuits to said control electrode for the generation of a distorted oscillatory voltage wave across said two circuits having principal components of both said frequencies, said harmonic frequency circuit being adjusted to produce only one major positive voltage peak in each cycle of said wave at said fundamental frequency, self-bias means responsive to flow of grid current in said device for biasing said control electrode so that anode current flows in said device only during said major peak in each said cycle, a second electron discharge device having input and output circuits, means coupling said output circuit to both said resonant circuits and for energizing said second device normally to constitute an effective load impedance in shunt to said circuits, and means for impressing said synchronizing pulses on said input circuit in a sense tending to reduce said effective load impedance.

WOLF J. GRUEN.

REFERENCES CITED

The following references are of record in the file of this patent:

UNITED STATES PATENTS

| Number | Name | Date |
|---|---|---|
| 1,654,903 | Sprague | Jan. 3, 1928 |
| 2,277,000 | Bingley | Mar. 17, 1942 |